United States Patent
Luber et al.

(10) Patent No.: US 10,577,857 B2
(45) Date of Patent: Mar. 3, 2020

(54) TAMBOUR-DOOR ASSEMBLY

(71) Applicant: GRAMMER AG, Amberg (DE)

(72) Inventors: Eberhard Luber, Illschwang (DE); Manuel Sauer, Amberg (DE); Tobias Schneeberger, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/636,708

(22) Filed: Jun. 29, 2017

(65) Prior Publication Data

US 2018/0002977 A1    Jan. 4, 2018

(30) Foreign Application Priority Data

Jun. 29, 2016   (DE) .................. 10 2016 007 854

(51) Int. Cl.
| | | |
|---|---|---|
| *E06B 9/15* | (2006.01) | |
| *B60R 7/04* | (2006.01) | |
| *B60R 7/08* | (2006.01) | |
| *E06B 9/11* | (2006.01) | |
| *B60R 11/00* | (2006.01) | |

(52) U.S. Cl.
CPC .............. *E06B 9/15* (2013.01); *B60R 7/04* (2013.01); *B60R 7/08* (2013.01); *E06B 9/115* (2013.01); *B60R 2011/0094* (2013.01); *E05Y 2900/538* (2013.01); *E05Y 2900/602* (2013.01); *E06B 2009/1555* (2013.01)

(58) Field of Classification Search
CPC .............. E06B 9/15; E06B 2009/1505; E06B 2009/1516; E06B 2009/1533; E06B 9/115; E06B 2009/1555; E06B 2009/1561; B60R 7/08; B60R 7/04
See application file for complete search history.

(56) References Cited

U.S. PATENT DOCUMENTS 8,579,151 B2 * 11/2013 Kodama ................ A45C 13/16
108/44

FOREIGN PATENT DOCUMENTS

CA           2831072      *  9/2012

* cited by examiner

*Primary Examiner* — Andrew T Kirsch
*Assistant Examiner* — Don M Anderson
(74) *Attorney, Agent, or Firm* — Andrew Wilford (57) ABSTRACT

A tambour door has an elongated first slat, at least one elongated second slat extending parallel to and adjacent the first slot and a deformable connecting strip extending along the first and second slats. Interengageable anchor formations on the strip and on the slits coupling same together while permitting the slats to move limitedly transversely of themselves relative to one another.

14 Claims, 10 Drawing Sheets

TAMBOUR-DOOR ASSEMBLY

FIELD OF THE INVENTION

The present invention relates to a tambour-door assembly. More particularly this invention concerns such an assembly for closing a storage container.

BACKGROUND OF THE INVENTION

Such a tambour door is used, for example, to cover a storage container in a vehicle. The storage container comprises one or more containers, for example, in which objects can be stowed away. The tambour door has a plurality of slats, with each slat being connected to at least one other slat.

Prior-art tambour doors have decorative covers attached to an array of parallel slats. Each slats is hinged to an adjacent parallel slat by two connectors at opposite ends of the slats. Each connector is secured to both of the slats. Assembly of such a tambour door is elaborate. Due to the play between the connector and the slat, a so-called accordion effect occurs when a plurality of slats was used so that the overall length of the tambour door increases when stretched and decreases when compressed.

In addition, so-called film hinges are known in tambour doors to connect the slats. For example, a film is sprayed onto the slats in an injection molding process to form the film hinges. This connection between the slats generally gives the impression of being of lower quality.

OBJECTS OF THE INVENTION

It is therefore an object of the present invention to provide an improved tambour-door assembly.

Another object is the provision of such an improved tambour-door assembly that overcomes the above-given disadvantages, in particular that is easy to assemble.

Another object is to provide a tambour door with no accordion effect.

SUMMARY OF THE INVENTION

A tambour door has according to the invention an elongated first slat, at least one elongated second slat extending parallel to and adjacent the first slot, a deformable connecting strip extending along the first and second slats, and interengageable anchor formations on the strip and on the slits coupling same together while permitting the slats to move limitedly transversely of themselves relative to one another.

In other words, the parallel first and second slats have at least one anchor formation that is in engagement with a mating anchor formation of at least one connecting strip for the purpose of connecting the first slat and the second slat so that they can move relative to one another, typically with the slats remaining parallel.

The slat can have two, three, or four anchor formation, for example, which are in engagement with a respective mating anchor formation of a connecting strip or with a mating anchor formation of one of several connecting strips. The connecting strip can have at least two mating anchor formations. For example, a plurality of slats or all slats are fastened to the connecting strip. For example, the first slat and the second slat are connected to one another with two or more connecting strips. For example, a plurality of slats or all slats are fastened to a first connecting strip and to the at least one second connecting strip.

The first connecting strip is attached to a first end of each slat, for example, and the second connecting strip is attached to an opposite end of the slat so as to be spaced apart in the longitudinal direction of the slat, for example. The alignment and supporting of the slats in relation to one another is advantageous if at least two connecting strips are provided which interconnect the neighboring ends of the first and the at least one second slat.

The first slat can be connected to the second slat with the connecting strip while being able to move relative to it. That is, the connecting strip enables the relative position between the first slat and the second slat to be changed. For example, the first slat and the second slat can be rotated about their longitudinal axis such that the slats form a flat, a concave, or a convex outer contour.

According to the invention, the connecting strip is formed by a ribbon. For example, the connecting strip is a flat ribbon. The ribbon has a substantially longer longitudinal extension with respect to its thickness and width. The connecting strip has the characteristic, for example, that it is not or is only slightly deformable in the direction of its longitudinal axis, i.e., in the direction of tension and compression, but is elastically deformable, particularly bendable, about at least one spatial axis. This ensures that the first slat and the second slat are able to assume different relative positions in relation to one another. The tambour door can then be guided on straight and on curved trajectories.

The connecting strip is made of a metal, a plastic, a natural material, or a composite material, for example. What is essential is that there be sufficient compressive and tensile strength that no deformation occurs in the longitudinal direction of the connecting strip.

The connecting strip is elastically deformable, for example. For example, the connecting strip can have an initial shape that makes the elastic deformation of the tambour door necessary during the assembly of the tambour door. The elastic restorative force can then bias the tambour door back into the initial shape. The connecting strip can be formed by a spring steel, for example, and be biased back into its initial shape under elastic deformation. As a result of a camber, for example—i.e., a bent initial shape of the connecting strip—the tambour door is pressed after assembly in a guide groove by the restorative force of the connecting strip against the guide surfaces, thereby preventing rattling as a result of play in the guide.

According to an alternative embodiment, the guide device is formed such that at least one projection with a non-circular cross section or at least two projections arranged successively in an offset manner in the direction of motion of the tambour door are provided on both sides of the slat. Through the slight rotation or skewing of the slat about a longitudinal central axis of the slat, the projections can be moved in contact with oppositely situated guide surfaces of the groove, thereby preventing rattling of the storage container. The skew can be achieved, for example, by having a cam arranged eccentrically to the longitudinal central axis be supported on the connecting strip such that the slat is rotated slightly.

The fastening of the connecting strip on the slat is achieved by means of a rivet connection, for example. For example, the slat is provided with at least one pin that is guided through recesses in the connecting strip and riveted on a side of the connecting strip facing away from the slat through deformation of the pin to form a rivet head. The connecting strip is then held in a form-fitting manner on the slat. If the pin is made of plastic, the rivet head can be produced by melting the pin to form a rivet head, for example.

According to an alternative, the connecting strip is fastened to the slat such that the slat has at least one pin with an enlarged free end that can be displaced through a recess in the connecting strip by means of elastic deformation. The free end or the recess can be elastically deformable. In this case, the connecting strip is clipped to the slat. Alternatively, other clip connections and other types of attachment, such as screw connections, adhesive connections, and other form-fitting connections, for example, are also worthy of consideration.

According to a special embodiment, at least one slat is formed as a slat to which a decorative cover is fastened. The decorative cover can also be fastened to the slat through clipping or riveting, for example.

According to a second aspect, the invention relates to a storage container.

Such a storage container is used in center consoles of vehicles, for example. As a manifest prior use, a storage container is known which comprises a container that can be sealed with a cover. The cover can be displaced between an open position in which the receptacle is accessible and a closed position in which the receptacle is closed in such a way as to not be accessible. The cover is formed by a tambour door.

It was the object of the invention to provide a storage container with tambour door for closing the receptacle that can be manufactured in a simple and cost-effective manner.

The object was achieved by a storage container with the features of claim 9.

The storage container comprises a recipient having an opening that can be closed by the tambour as a cover. The receptacle can comprise at least one compartment for holding miscellaneous small objects. The cover can be displaced between an open position and a closed position. In the open position of the cover, the receptacle can be accessed. In the closed position, the receptacle is closed by the tambour cover, and the receptacle cannot be accessed. In particular, objects located in the receptacle cannot get out of the receptacle when it is closed, which represents a substantial safety factor in emergency situations.

According to one embodiment, the storage container has a guide in which the tambour door is displaceable. For example, a first guide formation on the slat coacts with a second guide formation of at least one guide part of the storage container in order to guide the tambour door on a trajectory.

The first guide can be formed on opposite ends of the slat, for example, so that they are on side areas of the tambour door.

The guide is formed by a slideway or rail on which the slat ends slide, for example. Alternatively, however, a ball bearing or roller bearing can also be considered.

The guide has at least one projection that is guided in a groove or slot, for example. In particular, the projection slides in the groove. For example, the slat has at least one projection on each end projecting transversely to the direction of motion of the tambour door. The projections are guided in a groove forming an edge of the opening of the receptacle. Alternatively, the projection can also be formed on the base formed by the receptacle and the guide groove can be formed on the slat, for example.

BRIEF DESCRIPTION OF THE DRAWING

The above and other objects, features, and advantages will become more readily apparent from the following description, reference being made to the accompanying drawing in which:

FIG. 6a is a top view of just the tambour-door assembly;

FIG. 6b is a section taken along line VIb-VIb of FIG. 6a;

FIG. 6c is a section taken along line VIc-VIc of FIG. 6a;

SPECIFIC DESCRIPTION OF THE INVENTION

A storage container is generally designated in the drawings at 10. The same references in the various figures designated analogous parts, even if lowercase letters are added or omitted.

Figure 1:
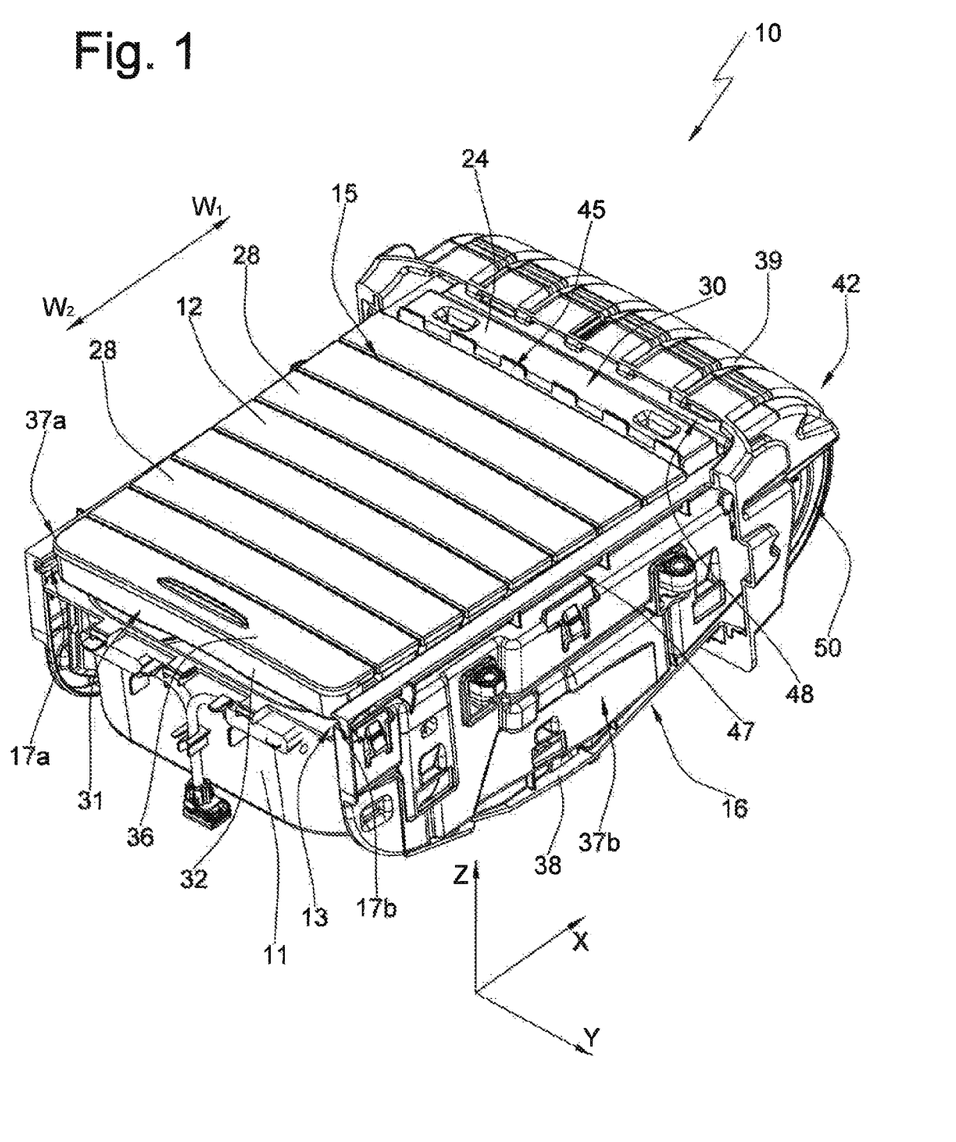
FIG. 1 is a perspective view of the storage container, with a cover formed as a tambour door being in a closed position.
Figure 2:
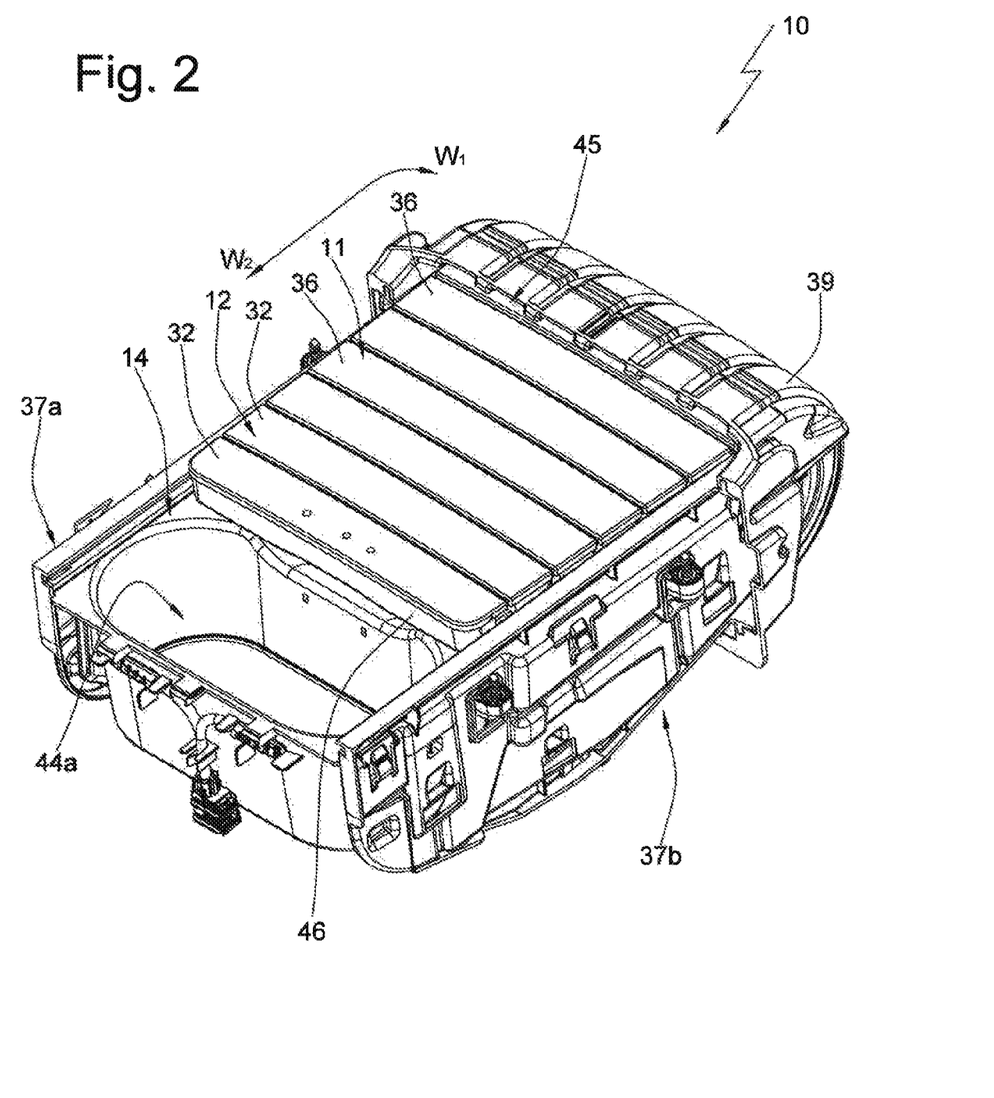
FIG. 2 like FIG. 1 shows the storage container with the tambour door being in an intermediate position between the closed position and an open position.
Figure 3:
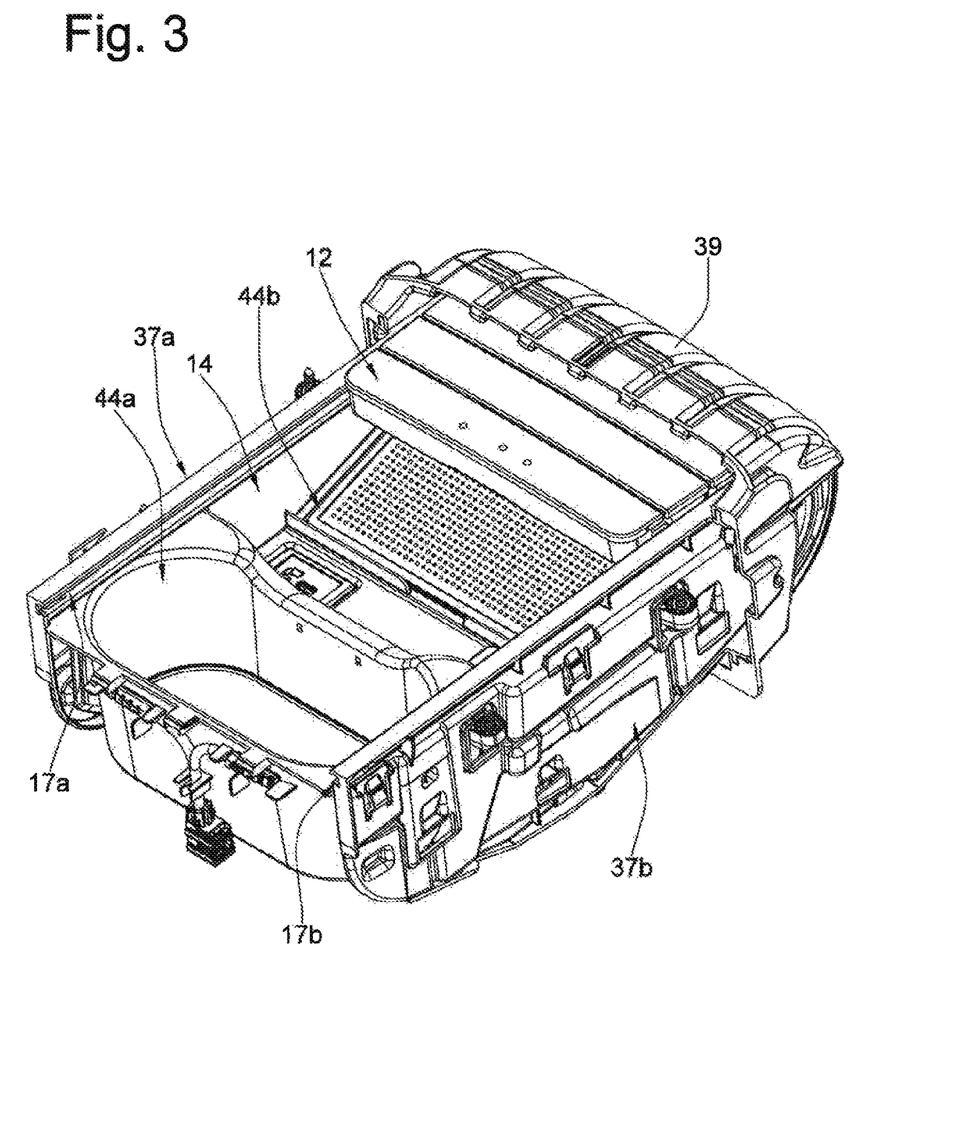
FIG. 3 like FIG. 2 shows the storage container with the tambour door in an intermediate position between the closed position and the open position, but more open than in FIG. 2.
Figure 4:
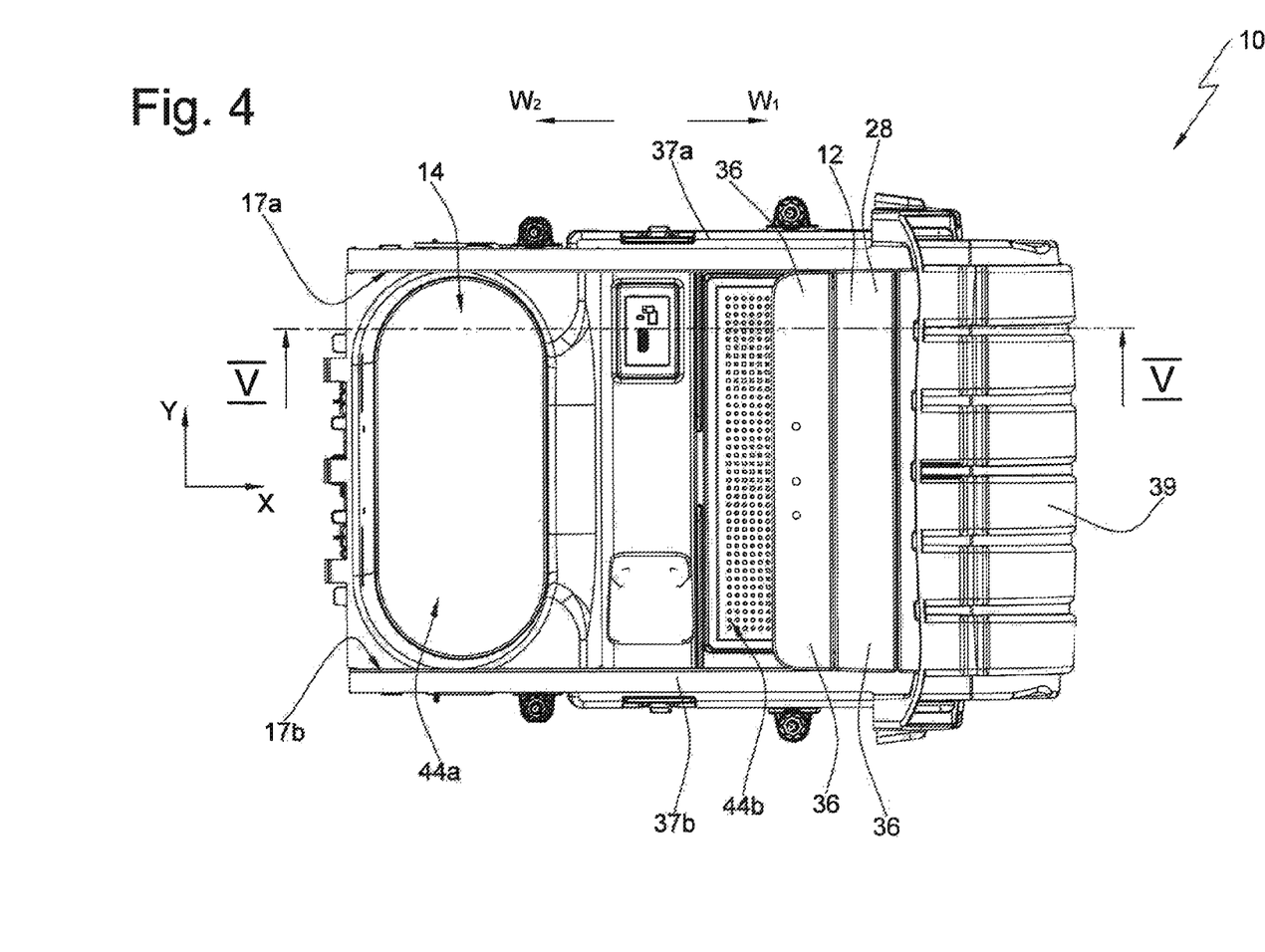
FIG. 4 is a top view of the storage container with the tambour door in the position of FIG. 3.
Figure 5:
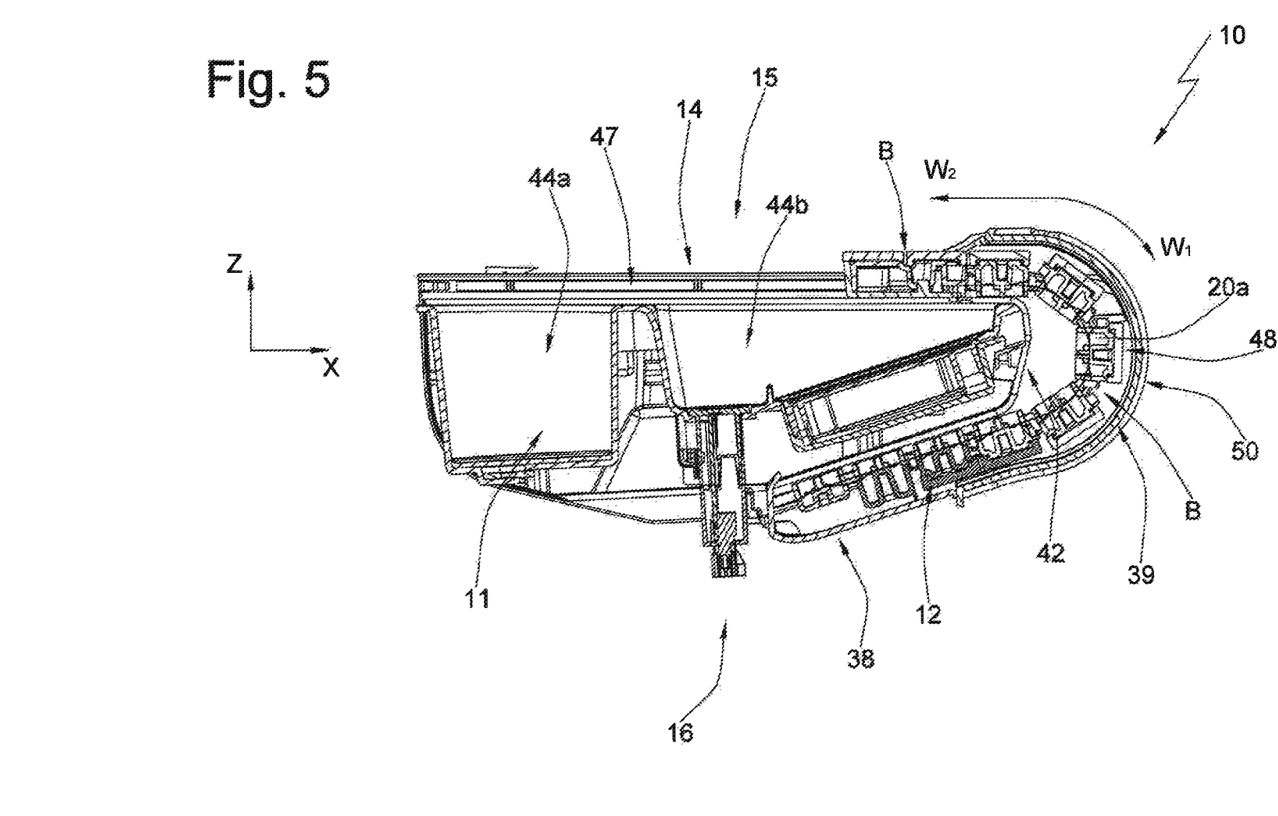
FIG. 5 is a section taken along line V-V of FIG. 4.

According to FIG. 1, the storage container 10 comprises at least one receptacle 11 having an opening 14 coverable by a tambour door 12 slidable in a guide 13 for the tambour door 12. The receptacle 11 can comprise one or more compartments or other recipients, holders, etc. that are accessible through the opening 14 that can be closed by the tambour door 12. The tambour door 12 can be displaced between a closed position (see FIG. 1) and a maximally opened position (see FIG. 3), referred to below as the open position. Moreover, the tambour door 12 can assume intermediate positions. An intermediate position is shown for the sake of example in FIG. 2.

When in the closed position, the tambour door 12 is substantially on an upper side 15 of the storage receptacle 11, whereas, when it is in the open position, the tambour door 12 extends around a rear end 42 of the storage receptacle 11 and partially on a lower side 16 of the storage receptacle 11 (see FIGS. 2 to 5). Here, the receptacle 11 forms upwardly open compartments 44a and 44b. In the open position, it is possible to access the compartments 44a and 44b through the opening 14. In the closed position, the opening 14 is closed. Objects cannot get out of the storage receptacle 11, and there is no access to the compartments 44a and 44b of the receptacle 11.

The tambour door 12 is guided with the guide 13 for travel in directions $w_1$ and $w_2$ along which it can move between the open position and the closed position. The guide 13 comprises straight grooves 17a and 17b open toward each other in which engage oppositely outwardly directed slide projections 18a and 18b of the cover 12 projecting transversely to the directions $w_1$ and $w_2$ of the cover 12. The grooves 17a and 17b are generally horizontal and parallel to one another.

They are associated with side panels 37a and 37b on side walls 43a and 43b of the receptacle 11. The grooves 17a and 17b comprise a linear region 47 as well as a curved region 50 (see FIG. 5).

FIGS. 6a to 8b show the cover assembly. The tambour door 12 comprises a set of slats 19, namely (see FIG. 6b) a front slat 32, six middle slats 33, and two end slats 24 and 25. The front slat 32 is on a front end 31 of the tambour door 12 and is wider than the middle slats 33 and the end slat, because the latter moves only in the linear region 47 of the grooves 17a and 17b. The end slats 24 and 25 are at a rear end 30. The end slat 24 is taller and provided with a comb 45 that extends parallel to a respective longitudinal central axis $m_1$ of the slat 19. The comb 45 pushes objects shifted into a channel 48 when the tambour door 12 moves into the open position back out of the stowage channel 48 when the tambour door 12 moves in the reverse direction $w_2$ into the closed position.

Figure 7:
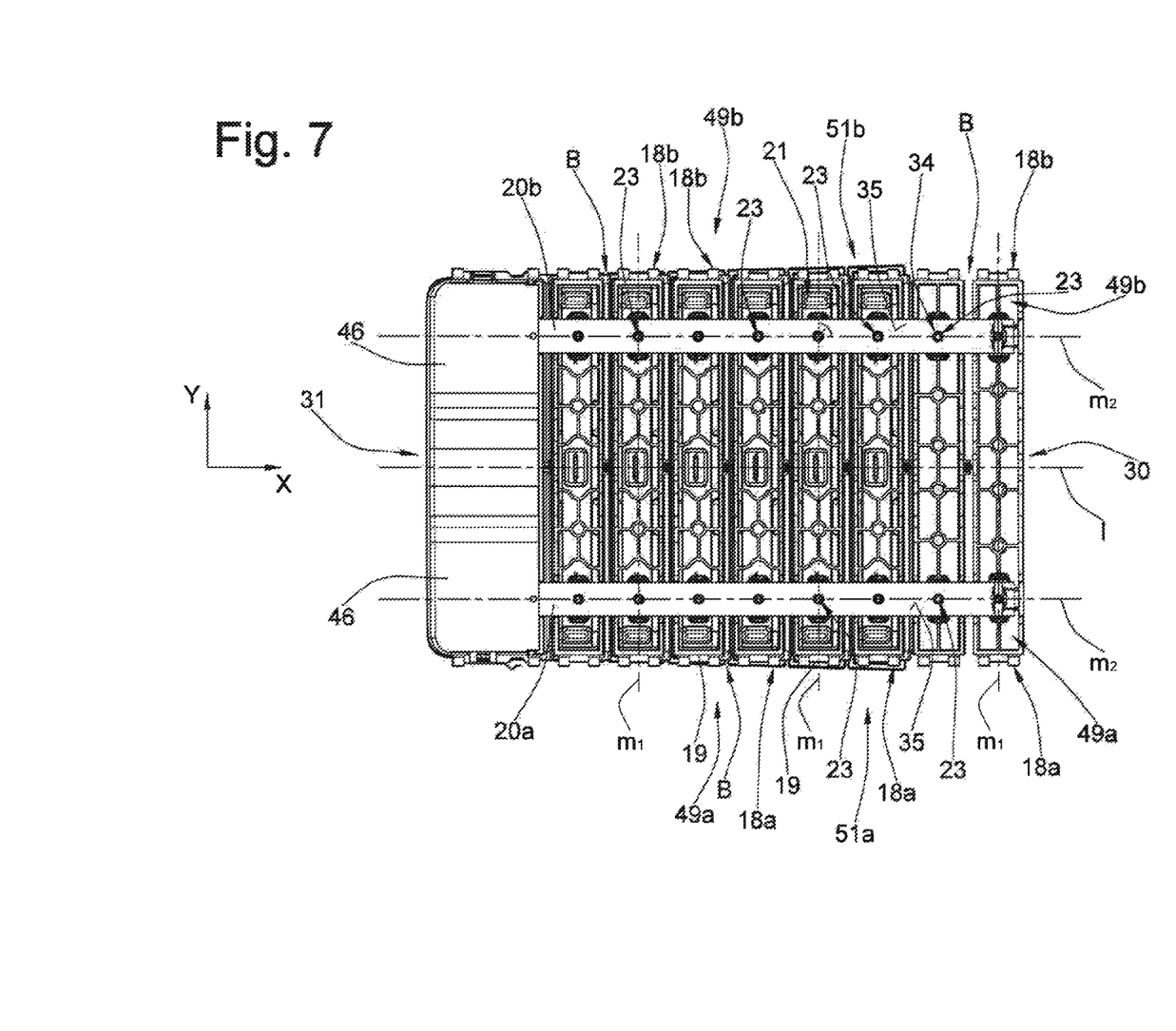
FIG. 7 is a bottom view of the tambour-door assembly.

According to FIG. 7, each slat 19 is fastened to two parallel but transversely spaced and substantially connecting strips 20a and 20b and is connected thereby to the other slats 19. The connecting strips 20a and 20b are each a ribbon. Each of the connecting strips 20a and 20b has a width that is a small fraction of to its length and a height that is a small fraction of its width. The connecting strips 20a and 20b can be deformed such that the cover 12 can be move along a curved trajectory. Here, the connecting strips 20a and 20b are formed by steel belts. Alternatively, however, another metal, a plastic, a textile, a natural material, or a composite material could also be used. However, the connecting strips 20a and 20b are substantially longitudinally inextensible and incompressible relative to respective longitudinal central axes $m_2$.

Figures 6A, 6C:
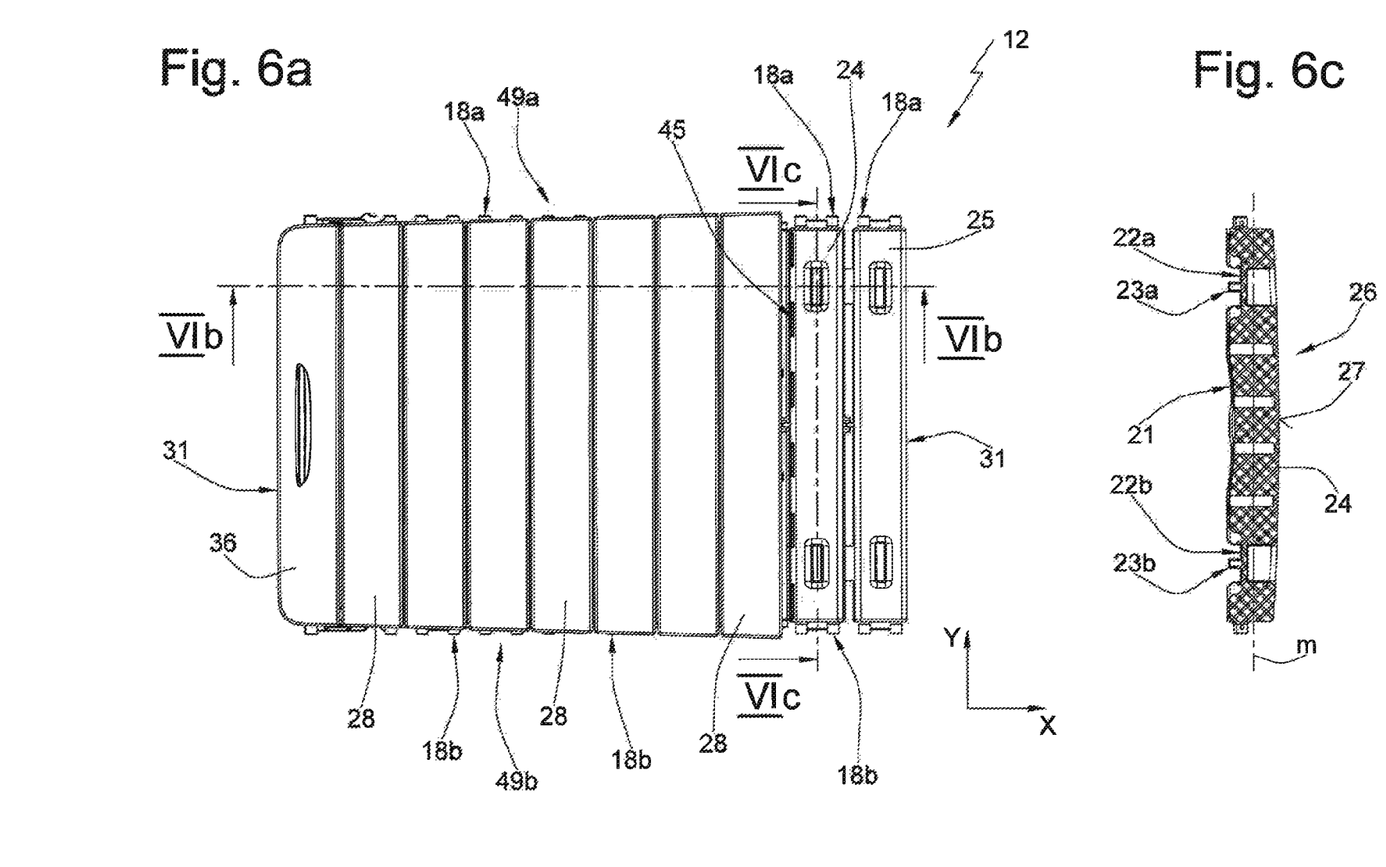
Figure 6B:
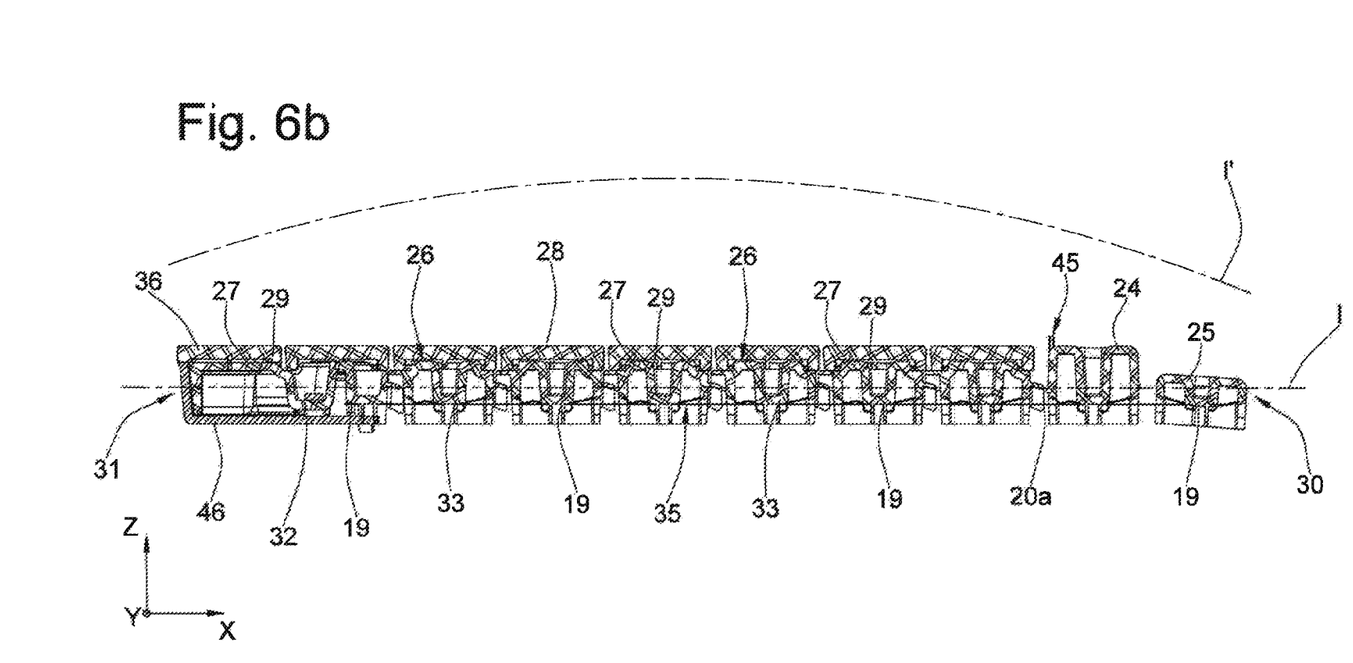

The connecting strips 20a and 20b extending along the slats 19 form hinges in intermediate regions B between neighboring slats 19 so the tambour door 12 can be displaced out of the extended generally planar position of FIG. 6b into a position that is bent about an axis y parallel to the axes $m_1$. The longitudinal axis 1 of the tambour door 12 is shown in FIG. 6b in a substantially flat and planar position. One theoretical arcuate position of the tambour door 12 is represented in FIG. 6b by a broken line r.

Here, the connecting strips 20a and 20b are made of spring steel of an arcuate shape in the direction of their longitudinal extension. When the tambour door 12 is located in the guide 13, the ribbons 20a and 20b are deformed against their return force and the projections 18a and 18b are held by this force against support faces of the grooves 17a and 17b. In this way, rattling as a result of play between the tambour door 12 and the grooves 17a and 17b is prevented.

According to an alternative embodiment (not illustrated), rattling could also be prevented by rotating each slat 19 slightly about the longitudinal central axis $m_1$. It can be seen in FIG. 7 that each slat 19 is provided with two projections 18a and two projections 18b. A slight rotation about the longitudinal central axis $m_1$ will cause one of the projections 18a of each slat to bear against a lower wall of the guide 17a and the other projection 18a to bear against an upper wall of the guide 17a, for example. The slats 19 can be tilted, for example, by having a cam mounted eccentrically relative to the longitudinal central axis $m_1$ be supported on the connecting strip 20a and, optionally, having a second eccentric cam be supported on the connecting strip 20b such that the slat 19 is rotated slightly.

On the upper side 26 (see FIG. 6b), the front slat 32 is provided with two decorative covers 36, and each middle slat 33 is provided with a decorative cover 28. These can be attached by welding or by a complementary snap fit, such as by clipping or riveting, for example. A lower surface 29 of each decorative cover 28 and 36 rests against a support face 27 of the respective slat 19.

A support face 22a for the connecting strip 20a and a support face 22b for the connecting strip 20b are formed on an underside 21 of each slat 19 (see FIG. 6c). A pin 23 for fastening the connecting strip 20a and/or connecting strip 20b projects out of each support face 22a and 22b.

Figure 8A:
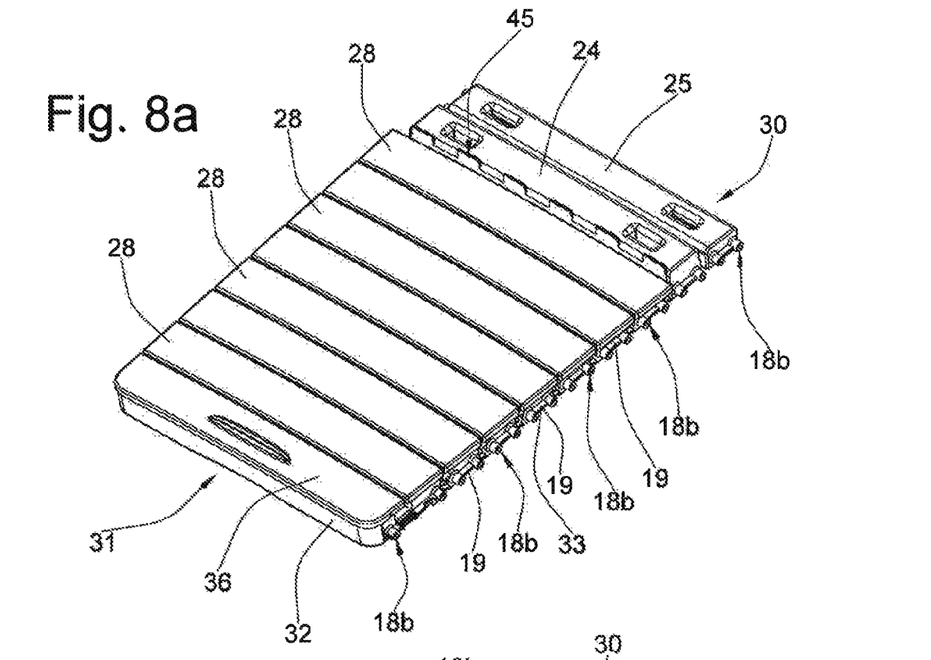
FIG. 8a is a perspective view of the tambour door from above.
Figure 8B:
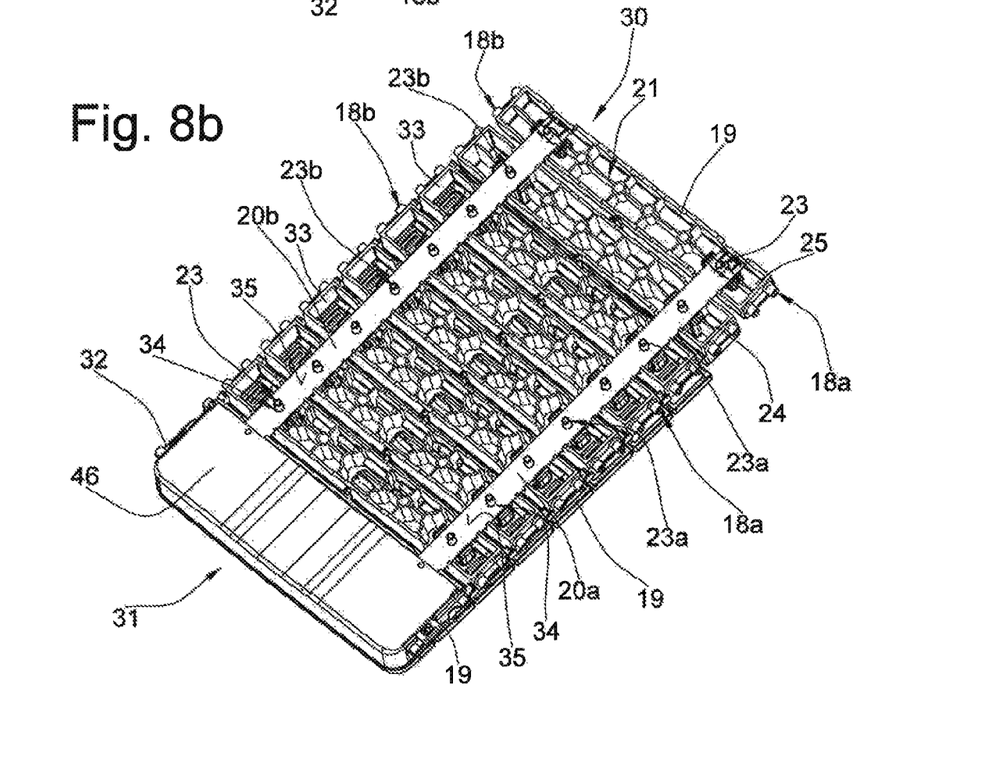
FIG. 8b is a perspective view of the tambour door from below.

FIGS. 7 and 8b show how the pins 23a and 23b project through openings 34 in the connecting strips 20a and 20b. The pins 23a and 23b are headed like rivets on a side 35 of the ribbons 20a and 20b facing away from the slats 19 by brief fusion of the plastic, for example, so that the connecting strips 20a and 20b are securely connected to the slats 19.

According to an alternative, the pins 23a and 23b could also have a thickening that can be displaced through the opening 34 with elastic deformation and then deform back into the original shape, thus preventing the pins 23a and 23b from moving out of the respective openings 34.

FIG. 7 shows how each slat 19 is provided on the sides 51a and 51b of the cover 12 with the two projecting projections 18a and with the two projecting projections 18b that extend parallel to the longitudinal central axes $m_1$ of the slats 19 in opposite directions away from the slat 19. The projections are part of the guide 13.

Figure 9:
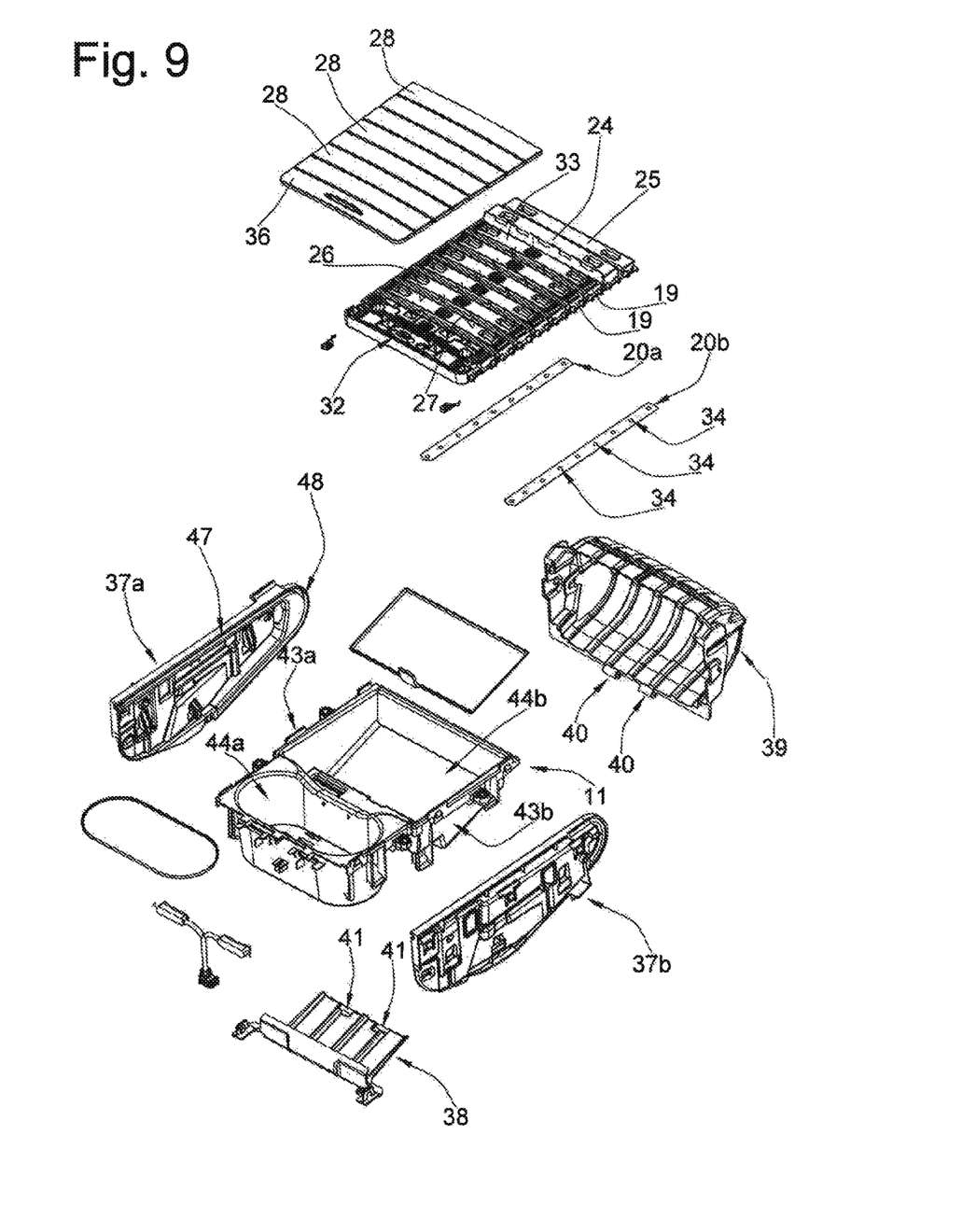
FIG. 9 is an exploded view of the storage container and tambour-door assembly.

Assembly of the storage container 10 is described below (see FIG. 9):

The slats 19 are parallel to one another in the correct sequence in an unillustrated holder, and the connecting strips 20a and 20b are mounted such that the pins 23a engage through the openings 34 of the connecting strip 20a and the pins 23b engage through the openings 34 of the connecting strips 20b. The free end of each pin 23a and 23b is then fused and formed into a rivet head that rests on the side 35 against the connecting strip 20a or the connecting strip 20b. The decorative covers 28 and 36 are then installed. Each decorative cover 28 and 36 comprises one middle and two terminal ribs (not shown). The ribs engage in corresponding grooves of the slats 19 and are welded with the slats 19.

The side panel 37a with the groove 17a and the side panel 37b with the groove 17b are mounted on the storage receptacle 11. A protective element 38 is then mounted on the receptacle 11, and another protective element 39 is mounted on the rear ends of the side panels 37a and 37b. The protective elements 38 and 39 are connected to one another by hooking tabs 40 of the protector 39 into webs 41 of the protector 38. The projections 18a and 18b of the slats 19 are then inserted into the corresponding grooves 17a and 17b until the projections 18 of all of the slats 19 have been received in the groove 17a and the projections 18b have been received in the groove 17b.

A shield 46 is mounted on the front slat 32 in order to prevent access to the underside of the tambour door 12 and complete the exterior.

We claim:

1. A tambour door comprising:
   an elongated first slat;
   at least one elongated second slat extending parallel to and adjacent the first slat;
   a deformable connecting strip extending along the first and second slats and having a transverse width dimension extending parallel to the slats and a longitudinal dimension transverse to the slats and substantially greater than the transverse dimension; and
   interengageable anchor formations on the strip and on the slats coupling same together while permitting the slats to move limitedly transversely of themselves relative to one another, the strip being elastically deformable such that the door can have a straight or curved shape.

2. The tambour door defined in claim 1, wherein the connecting strip is made of metal, plastic, a natural material, or a composite material.

3. The tambour door defined in claim 1 wherein the strip is formed by a pair of parallel ribbons extending crosswise of the slats and juxtaposed with opposite ends of the slats.

4. The tambour door defined in claim 1, wherein the connecting strip is elastically bendable.

5. The tambour door defined in claim 3, wherein the connecting strip is of arcuate shape when unstressed.

6. A tambour door comprising:
an elongated first slat;
at least one elongated second slat extending parallel to and adjacent the first slat;
a deformable connecting strip extending along the first and second slats;
interengageable anchor formations on the strip and on the slats coupling same together while permitting the slats to move limitedly transversely of themselves relative to one another; and
means for twisting each of the slats about a respective longitudinal axis relative to the strip.

7. The tambour door defined in claim 1, wherein the interengageable anchor formations are rivets projecting from the slats through the connecting strip.

8. The tambour door defined in claim 1, wherein each slat is provided with a decorative cover.

9. In combination with the tambour door defined in claim 1:
a receptacle having an opening blockable by the tambour door.

10. The combination defined in claim 9, wherein the receptacle is formed at the opening with guides in which ends of the slats are slidable.

11. The combination defined in claim 10, wherein the slats are provided on the ends with outwardly extending projections engaged in the guides.

12. The combination defined in claim 10, wherein each end of each slat is provided with two of the projections.

13. In combination:
a receptacle having an opening with opposite edges each carrying a respective guide;
an array of parallel elongated slats each extending along a respective longitudinal axis and having ends engaged in the guides;
a pair of transversely extending, separate, and longitudinally spaced connecting strips each extending along all of the slats adjacent a respective one of the ends of each slat at the guides, the strips each being flexible; and
formations on the slats and formations on the strips complementarily interfitting with the formations on the slats, the formations coupling the slats to the strips such that the slats can move between a closed position blocking the opening and an open position freeing the opening.

14. The tambour door defined in claim 1, wherein the strip is underneath the slats.

* * * * *